United States Patent [19]

Ohtomo et al.

[11] Patent Number: 5,120,192
[45] Date of Patent: Jun. 9, 1992

[54] COOLED TURBINE BLADE AND COMBINED CYCLE POWER PLANT HAVING GAS TURBINE WITH THIS COOLED TURBINE BLADE

[75] Inventors: Fumio Ohtomo, Ayase; Tatsuo Araki, Tokyo; Asako Matsuura, Yokohama; Yoshiaki Tsukumo, Tokyo, all of Japan

[73] Assignee: Kabushiki Kaisha Toshiba, Kawasaki, Japan

[21] Appl. No.: 491,823

[22] Filed: Mar. 12, 1990

[30] Foreign Application Priority Data

Mar. 13, 1989 [JP] Japan ................................. 1-57831

[51] Int. Cl.⁵ ............................................. F01D 5/18
[52] U.S. Cl. ................................. 415/115; 416/96 A
[58] Field of Search ............... 416/96 R, 96 A, 97 R; 415/115, 116

[56] References Cited

U.S. PATENT DOCUMENTS

| | | | |
|---|---|---|---|
| 2,779,565 | 1/1957 | Bruckmann | 416/96 A |
| 2,873,944 | 2/1959 | Wiese et al. | 416/96 A |
| 3,891,348 | 6/1975 | Auxier | 416/964 |
| 4,180,373 | 12/1979 | Moore et al. | 416/97 R |

FOREIGN PATENT DOCUMENTS

| | | |
|---|---|---|
| 853499 | 10/1970 | Canada .............................. 416/96 A |
| 1050895 | 3/1979 | Canada .............................. 416/96 A |
| 2065334 | 4/1973 | Fed. Rep. of Germany . |
| 1404931 | 5/1965 | France . |
| 2174497 | 10/1973 | France . |
| 2457965 | 12/1980 | France . |
| 55-14241 | 4/1980 | Japan . |
| 55-107005 | 8/1980 | Japan . |
| 59-85305 | 6/1984 | Japan . |
| 63-40244 | 8/1988 | Japan . |
| 2054749 | 2/1981 | United Kingdom . |
| 2093923 | 9/1982 | United Kingdom . |

*Primary Examiner*—John T. Kwon
*Attorney, Agent, or Firm*—Oblon, Spivak, McClelland, Maier & Neustadt

[57] ABSTRACT

A blade includes a blade body having a cavity, an insert inserted in the cavity, a plurality of impingement holes formed in a circumferential wall of the insert, and a recovery path for recovering a cooling medium sprayed from the impingement holes. The cooling medium can be recovered without being discharged into a main gas. A gas turbine having this blade is used for a combined cycle power plant. In this plant, steam is supplied as a cooling medium to the blade, and the steam recovered from the blade is supplied to a steam turbine.

9 Claims, 17 Drawing Sheets

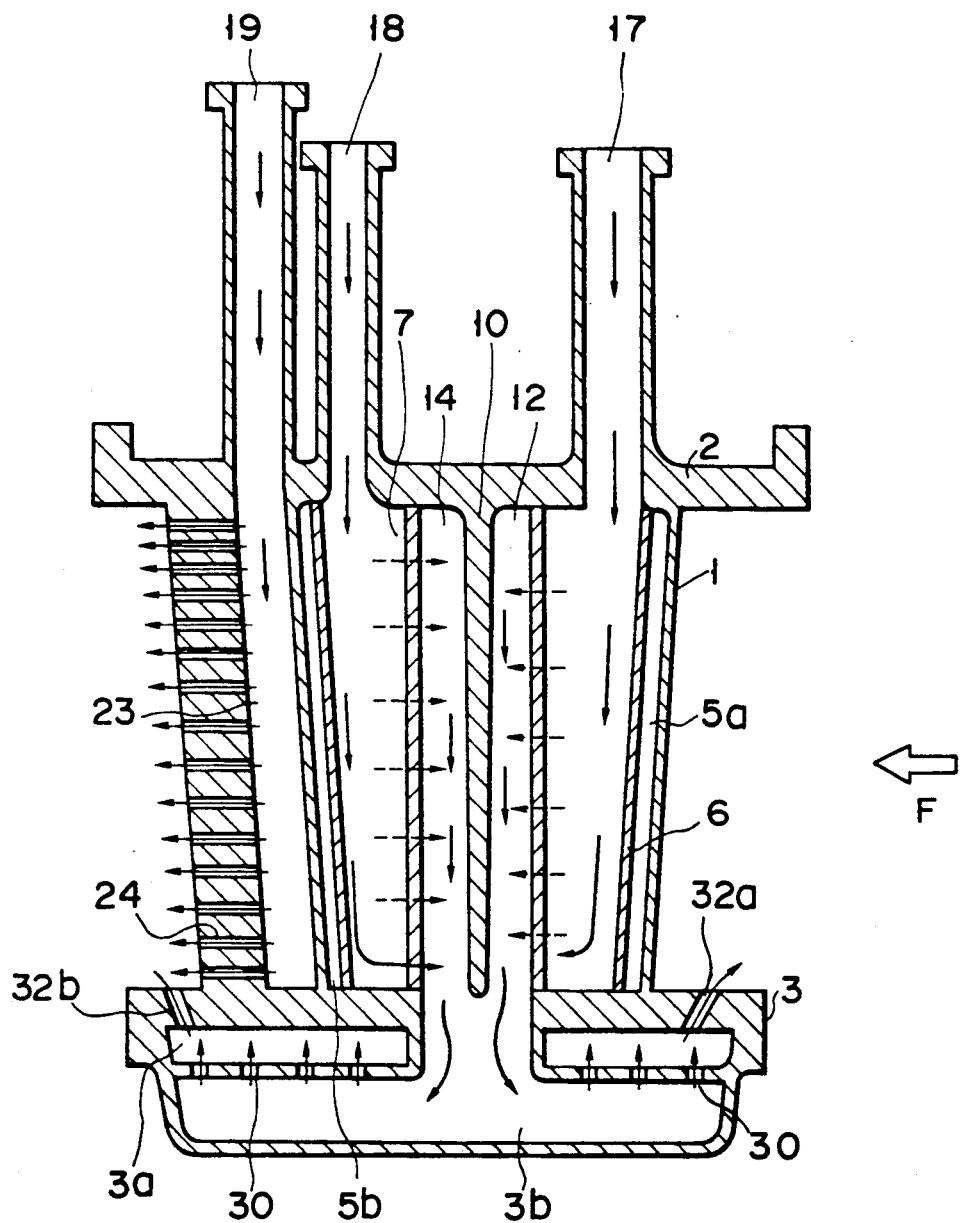
F I G. 5

COOLED TURBINE BLADE AND COMBINED CYCLE POWER PLANT HAVING GAS TURBINE WITH THIS COOLED TURBINE BLADE

BACKGROUND OF THE INVENTION

1. Field of the Invention

The present invention relates to a cooled turbine blade and a combined cycle power plant having a gas turbine with this cooled turbine blade.

More specifically, the present invention relates to a cooled turbine blade in which a cooling medium flow is improved. This blade is suitably cooled with steam. The gas turbine having this blade is used in a combined cycle power plant, and the blade is cooled by the steam generated in this plant, and the steam which cooled the blade is recovered and supplied to a steam turbine.

2. Description of the Related Art

In a gas turbine, when a turbine gas temperature of a main gas is increased, thermal efficiency can be improved. For this reason, the gas turbine is designed to maximize the turbine gas temperature. For this purpose, heat resistance of the turbine blade must be improved. A flow path for a cooling medium is formed inside the blade, and the cooling medium such as a cooling gas flows through the flow path. The blade is cooled by the cooling gas which flows through the flow path, thereby improving the heat resistance of the blade.

FIG. 1 is a cross-sectional view of a conventional cooled turbine blade of this type. The blade shown in FIG. 1 is a stator blade in a turbine. This blade is made of a super alloy, and cavities are formed inside the blade. A partition wall 203 is formed at the central portion inside the blade in a direction of chord, and the partition wall 203 continues in a direction of span. A plurality of openings 205 are formed in the partition wall 203. The internal space of the blade is partitioned into fore and aft cavities by the partition wall 203. These cavities extend in the direction of span and are open to at least one tip. A fore insert 201 and an aft insert 204 are inserted into the cavities from the tip. These inserts 201 and 204 are hollow cylindrical members. Many impingement holes 202 and 206 are formed in the wall surfaces of the inserts 201 and 204, respectively. A plurality of small-diameter paths 207 are formed at a trailing edge of the blade in the direction of chord. The leading ends of these paths 207 communicate with the aft cavity, and their trailing ends are open to the trailing edge of the blade.

A cooling ga such as air is supplied to the inserts 201 and 204, and this air is sprayed from the impingement holes 202 and 206 and collides against the inner wall surface of the blade to cool the wall of the blade. The air sprayed from the insert 201 flows in a space between the outer circumferential surface of the fore insert 201 and the inner wall surface of the blade in the direction of chord. The air then flows in the aft cavity through the openings 205 formed in the partition wall 203 and is the mixed with air sprayed from the aft insert 206. The mixed air flows between the outer circumferential surface of the aft insert 206 and the inner wall surface of the blade in the direction of chord and is discharged into the main gas from the trailing edge of the blade through the paths 207.

This conventional turbine blade has the following drawback. The gas flowing between the outer circumferential surfaces of the inserts and the inner wall surface of the blade crosses the gas spraying from the impingement holes of these inserts to set a crossed flow state, thereby degrading the cooling effect of the blade wall.

The cooling gas sprayed from these inserts is discharged into the main gas and is mixed therewith. The temperature of the main gas is decreased to degrade turbine efficiency. For this reason, the cooling gas cannot have an excessively high flow rate, and sufficient cooling cannot be performed.

Use of steam as the cooling gas has been taken into consideration. The steam has a larger specific heat than air, and a cooling effect can be improved. When this steam is discharged in the main gas, however, a decrease in temperature of the main gas is increased due to a large specific heat of steam, resulting in inconvenience.

SUMMARY OF THE INVENTION

It is an object of the present invention to solve the conventional problem described above and to provide a turbine blade having high cooling efficiency.

It is another object of the present invention to provide a turbine blade capable of using steam as a cooling gas.

It is still another object of the present invention to provide a highly efficient combined cycle plant comprising a gas turbine with the above turbine blade.

The above objects of the present invention can be achieved by the features of the present invention. A blade of the present invention comprises a blade body having cavities therein. These cavities extend in a direction of span. A hollow insert is inserted in each cavity. A plurality of impingement holes are formed in the wall surface of the insert. A cooling medium such as steam is supplied to the insert and is sprayed through the impingement holes. The sprayed cooling medium collides with the inner wall surface of the blade body, thereby cooling the blade body. A recovery path is formed in the blade body in the direction of span. A plurality of recovery holes are formed in the walls constituting the recovery path. The steam spraying from the impingement holes of the insert cools the blade body and flows in the recovery path through the recovery holes and is then recovered from a tip portion of the blade body through the recovery path. The recovery path is preferably formed adjacent to the insert to minimize a distance from a position where the steam is sprayed from the impingement holes of the insert to a position where the steam flows in the recovery path in the direction of chord or span.

According to the characteristic feature of the present invention, a cross-flow between the flow of the steam sprayed from the impingement holes in the direction of chord or span and the steam sprayed from the impingement holes can be suppressed to improve cooling efficiency.

The steam is recovered after it cools the blade body. The steam is not discharged into the main gas. Therefore, even if the flow rate of the cooling steam is increased, the temperature of the main gas is not degraded, and efficiency of the turbine is not degraded.

A combined cycle power plant according to the present invention comprises a gas turbine having the above blade. Steam is produced by discharge from the gas turbine, and the steam turbine is driven by this steam. The steam turbine and the gas turbine cooperate to drive the steam turbine. Part of the steam is supplied to the blade of the gas turbine to cool the blade. The steam which cooled the blade is recovered and is returned to the steam turbine.

In this plant, the blade of the gas turbine is cooled by the steam, and cooling efficiency of the blade is high. The turbine gas temperature of the main gas in the gas turbine can be increased, and efficiency of the gas turbine can be improved accordingly. The steam used to cool the blade is recovered, but is not mixed with the main gas. The temperature of the cooling gas is not decreased, and efficiency of the gas turbine is not degraded. As the steam which cooled the blade is recovered and returned to the steam turbine, efficiency of this plant can be improved.

The blade according to the present invention is most suitable when steam is used as a cooling gas. The blade of the present invention, however, can also be effective when another cooling medium is used. The present invention is not limited to the blade using cooling gas as steam. The blade according to the present invention can be cooled by another cooling medium such as air. A liquefied natural gas, a liquefied petroleum gas, or the like can be used as a cooling medium. In the case where the cooling medium has a small specific heat, like air, the medium need not be collected; it can be discharged into the main gas. The advantages of the invention can be attained if the cross-flow only is prevented.

BRIEF DESCRIPTION OF THE DRAWINGS

The present invention will be apparent from the following description of preferred embodiments in conjunction with the accompanying drawings, in which:

FIG. 5 is a longitudinal sectional view of a blade according to the third embodiment of the present invention;

DETAILED DESCRIPTION OF THE PREFERRED EMBODIMENTS

Each preferred embodiment to be described below exemplifies a first-stage stator blade for a turbine. The blade uses steam as a cooling medium. However, the present invention is not limited to the blade using steam as the cooling gas. A direction of a main gas flow is indicated by arrow F.

Figure 2:
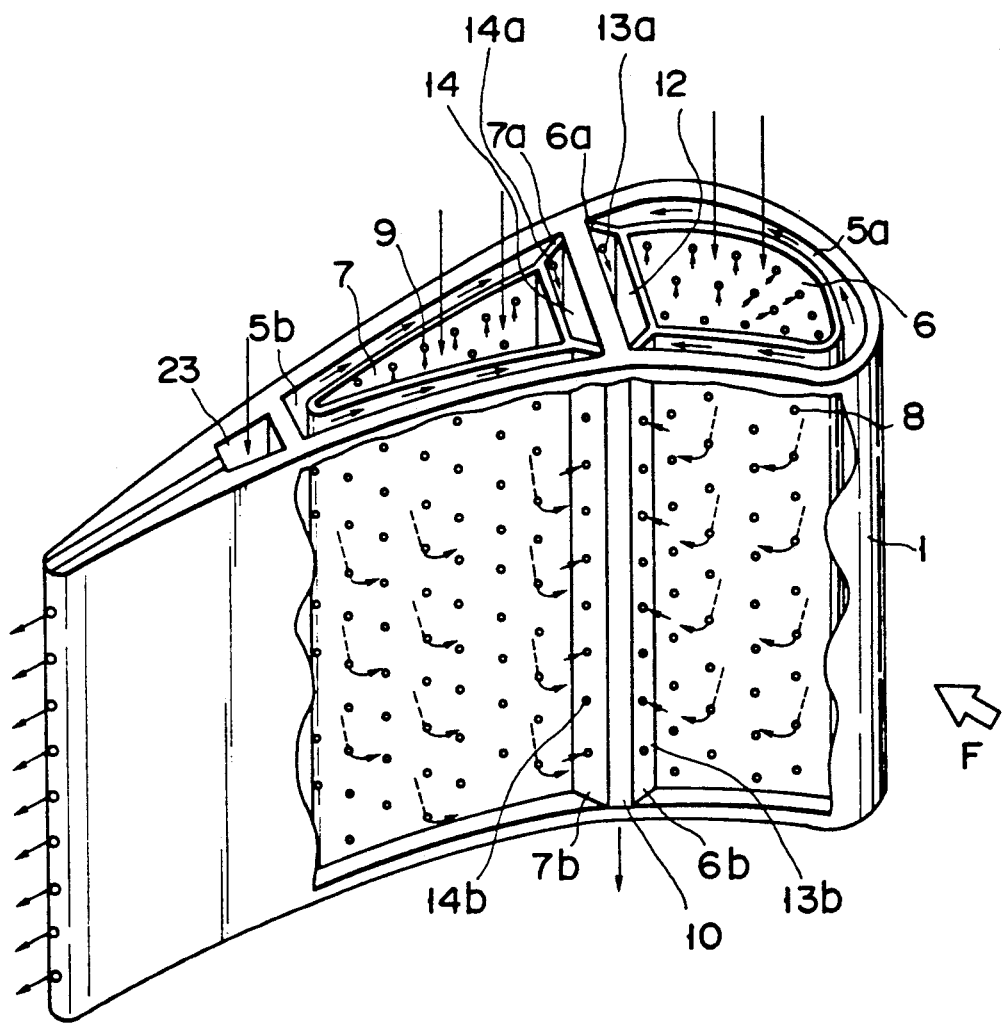
FIG. 2 is a partially cutaway perspective view of a blade according to the first embodiment.
Figure 3:
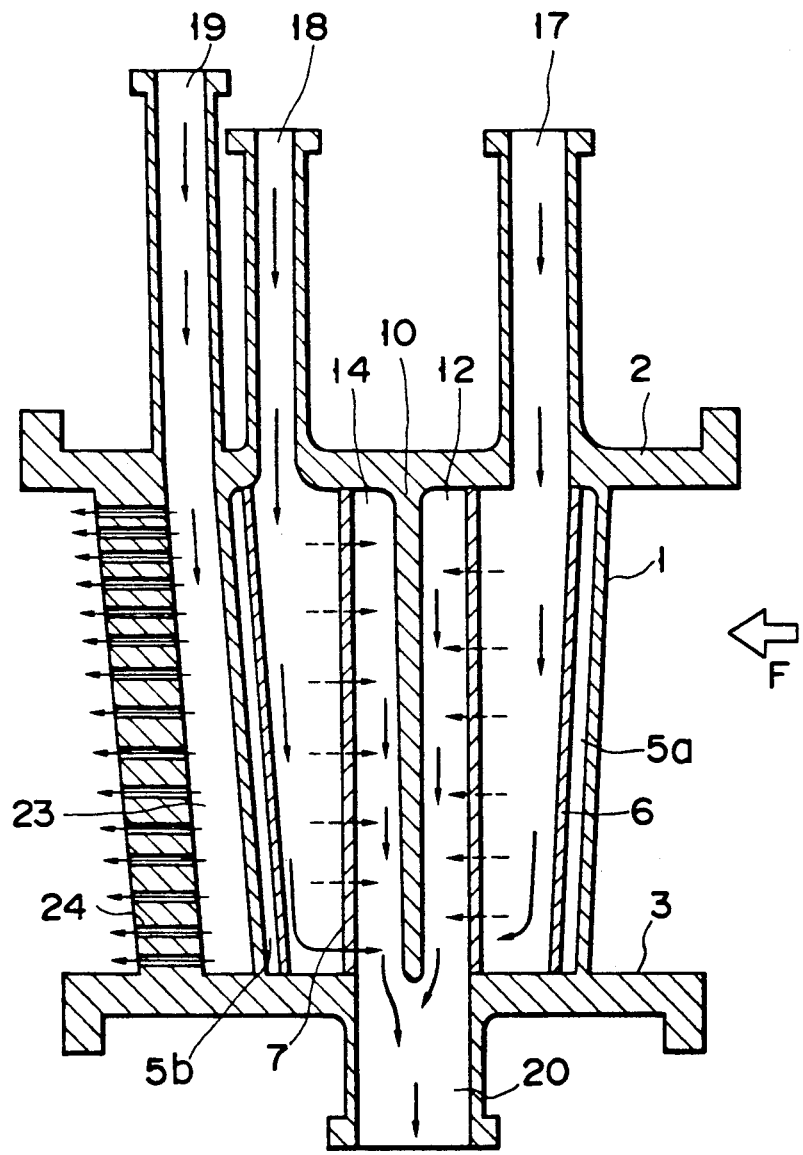
FIG. 3 is a longitudinal-sectional view of the blade of the first embodiment shown in FIG. 2.

FIGS. 2 and 3 show a blade according to the first embodiment of the present invention. More particularly, FIG. 2 is a partially cutaway perspective view of the blade, and FIG. 3 is a longitudinal sectional view thereof. Reference numeral 1 denotes a blade body of this blade. Inner and outer shrouds 2 and 3 are respectively formed at both tips of the blade body 1. The blade body 1 is mounted on a gas turbine casing (not shown) through the shrouds 2 and 3. The interior of the blade body 1 is constituted by cavities. These cavities are divided by a partition wall 10 The partition wall 10 extends in a direction of span. The interior of the blade body is partitioned by the partition wall 10 to define fore and aft cavities 5a and 5b. The cavities 5a and 5b extend in the direction of span. Fore and aft inserts 6 and 7 are inserted into the cavities 5a and 5b, respectively. Both ends of each of these inserts 6 and 7 are fixed to a corresponding one of the shrouds 2 and 3.

Ribs 6a, 6b, 7a, and 7b extend from both sides of the trailing edge portion of the fore insert 6 and both sides of the leading edge portion of the aft insert 7. A fore recovery path (fore guide path) 12 surrounded by the rear wall of the fore insert 6, the ribs 6a and 6b, and the partition wall 10 is formed. An aft recovery path (aft guide path) 14 surrounded by the front wall of the aft insert 7, the ribs 7a and 7b, and the partition wall 10 is formed. These recovery paths 12 and 14 extend in the direction of span.

Pluralities of small-diameter impingement holes 8 and 9 are formed in the side walls of the inserts 6 and 7, respectively. Recovery holes 13a, 13b, 14a, and 14b are formed in the ribs 6a, 6b, 7a, and 7b, respectively.

A trailing edge cooling path 23 is formed inside the trailing edge portion of the blade body 1 along the direction of span. A plurality of small-diameter discharge cooling paths 24 are formed in the rear side of the trailing edge cooling path 23. These discharge cooling paths 24 are formed along the direction of chord of this blade. The leading end portions of these discharge cooling paths 24 communicate with the trailing edge cooling path 23, and their trailing end portions are open to the trailing edge of the blade body 1.

Cooling gas supply ports 17, 18, and 19 are formed in the outer shroud 2. The supply port 17 communicates with the fore insert 6, the supply port 18 communicates with the aft insert 7, and the supply port 19 communicates with the trailing edge cooling path 23. A cooling gas recovery port 20 is formed in the inner shroud 3. The recovery port 20 communicates with the recovery paths 12 and 14. The cooling gas supply ports 17, 18, and 19 communicate with a cooling gas recovery path (not shown) formed in the casing of the gas turbine. The cooling gas recovery path 20 communicates with a cooling gas recovery path (not shown) formed in the casing.

Steam as a cooling gas is supplied to the cooling gas supply ports 17, 18, and 19 in the blade of the first embodiment. The steam supplied to the supply ports 17 and 18 flows in the fore and aft inserts 6 and 7 in the direction of span and is sprayed from the impingement holes 8 and 9. The jet of the steam collides against the inner wall surface of the blade body 1 to cool the blade body 1. The steam sprayed from the impingement holes 8 and 9 flows between the outer circumferential surfaces of the inserts 6 and 7 and the inner wall surface of the blade body 1 in the direction of chord. The steam then flows from the recovery holes 13a, 13b, 14a, and 14b to the recovery paths 12 and 14, and is then recovered through the recovery port 20.

The steam supplied from the supply port 19 flows in the trailing edge cooling path 23 in the direction of span and then flows from the path 23 to the discharge cooling path 24 in the direction of chord, thereby cooling the trailing edge portion of the blade body 1. This steam is discharged from the trailing end portion of the discharge cooling path 24 to the main gas.

In the blade according to the first embodiment, since the recovery paths 12 and 14 are located near the inserts 6 and 7, a distance from a position where the steam is sprayed from the impingement holes 8 and 9 of the inserts to a position where the steam is recovered into the recovery paths 12 and 14 is short. Therefore, the flow rate (per unit area) of the steam flowing in the direction of chord is small. A cross-flow between the steam flow in the direction of chord and the jet of the steam sprayed from the impingement holes can be reduced, and cooling efficiency of the blade body can be improved.

The steam used to cool the blade body is recovered through the recovery paths 12 and 14 and is not discharged into the main gas, thereby preventing degradation of turbine efficiency without reducing the temperature of the main gas. In the first embodiment, the steam supplied to the trailing edge cooling path 23 is discharged into the main gas. However, the steam supplied to the trailing edge cooling path 23 has a low flow rate, and a decrease in temperature of the main gas is small.

When the gas turbine having the above blade is used in the combined cycle power plant, the recovered steam is returned to the steam turbine to improve efficiency of the plant.

Figure 4:
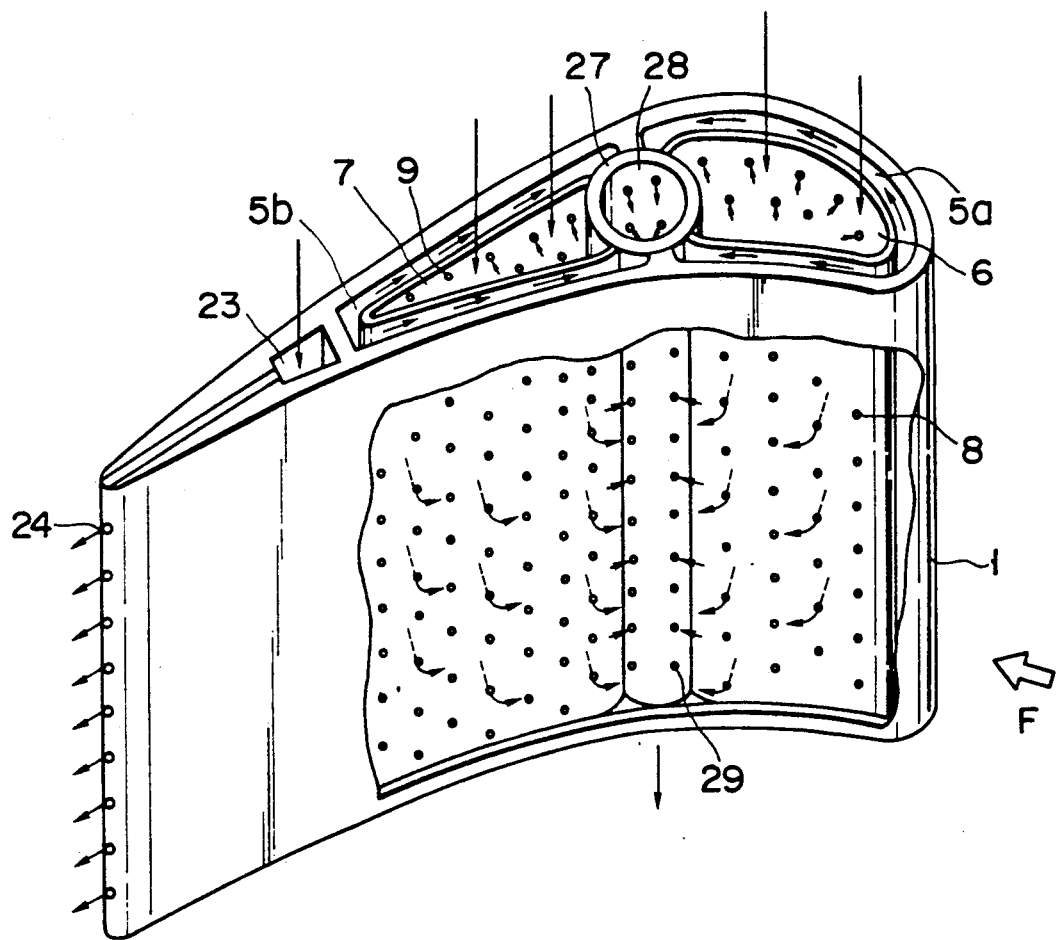
FIG. 4 is a partially cutaway perspective view of a blade according to the second embodiment of the present invention.

FIG. 4 shows a blade according to the second embodiment of the present invention. The blade of the second embodiment has the same arrangement as that of the first embodiment except for the following member. The same reference numerals as in the first embodiment denote the same parts in the second embodiment in FIG. 4, and a detailed description thereof will be omitted. In the blade of the second embodiment in cylindrical member 27 is inserted in place of the partition wall 10. A recovery path 28 is defined inside the cylindrical member 27. A plurality of recovery holes 29 are formed in the wall of the cylindrical member 27.

FIG. 5 shows a blade according to the third embodiment of the present invention. The blade of the third embodiment has the same arrangement as that of the first embodiment except for the following members. The same reference numerals as in the first embodiment denote the same parts in the third embodiment in FIG. 5, and a detailed description thereof will be omitted. In the blade of the third embodiment, a recovery port 3b is formed in almost the entire lower surface of an inner shroud 3, and a shroud cooling path 3a is formed between the recovery port 3b and the inner shroud 3. The recovery port 3b and the shroud cooling path 3a communicate with each other through a plurality of cooling holes 30. A plurality of discharge holes 32a and 32b are formed in the edge portion of the inner shroud 3, and these discharge holes communicate with the shroud cooling path.

In the blade according to the third embodiment, steam in the recovery port 3b is sprayed from cooling holes 30 to the shroud cooling path 3a, and a steam jet collides against the lower surface of the inner shroud 3 to cool the shroud. This steam is discharged from the discharge ports 32a and 32b into the main gas.

In the blade according to the third embodiment, a blade body 1 and the inner shroud 3 are cooled. Since cooling gas supply ports 17, 18, and 19 are formed in an outer shroud 2, the outer shroud 2 can be cooled by steam passing through these ports.

Figures 6, 7:
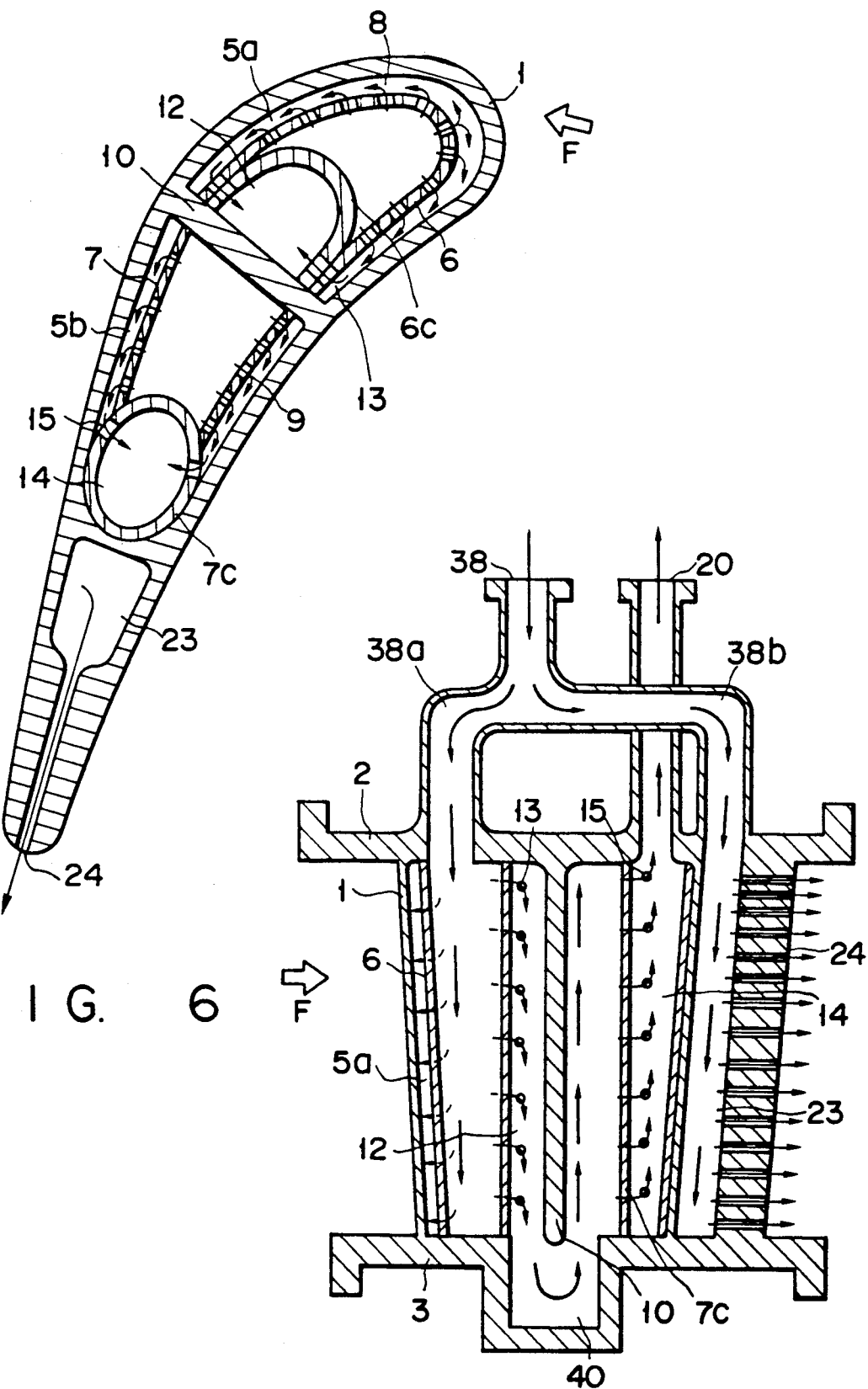
FIG. 6 is a cross-sectional view of a blade according to the fourth embodiment of the present invention
FIG. 7 is a longitudinal sectional view of the blade of the fourth embodiment shown in FIG. 6.

FIGS. 6 and 7 show a blade according to the fourth embodiment. The blade according to the fourth embodiment is the same as that according to the first embodiment except for portions to be described below. The same reference numerals as in the first embodiment denote the same parts in FIGS. 6 and 7, and a detailed description thereof will be omitted.

In the fourth embodiment, a fore insert 6 having a U sectional shape is inserted into a fore cavity 6a. A recovery wall 6c having a U sectional shape is located inside the trailing edge portion of the fore insert 6. A space surrounding by the recovery wall 6c and a partition wall 10 is formed in a fore recovery path 12. A plurality of recovery holes 13 are formed in the trailing edge portions of the fore insert 6 and the recovery wall 6c. An aft insert 7 constituted by a pair of side walls is inserted in an aft cavity 5b. A cylindrical member 7c having an elliptical sectional shape is inserted into the trailing edge portion of the aft cavity 5b. An aft recovery path 14 is formed inside the cylindrical member 7c. A recovery hold 15 is formed in the cylindrical member 7c.

A communication path 40 is formed at the central portion of the inner shroud 3. The recovery path 12 and the interior of the aft insert 7 communicate with each other through the communication path 40. A cooling gas supply port 38 is formed in the outer shroud 2, and the supply port 38 is branched into two branch supply ports 38a and 38b. One branch supply port 38a communicates with the fore insert 6, and the other branch supply port 38b communicates with a trailing edge cooling path 23. A recovery port 20 is formed in the outer shroud 2 and communicates with the aft recovery port 14.

In the blades of the fourth embodiment, the steam supplied from the supply port 38 is supplied to the fore insert 6 and the trailing edge cooling path 23 through the two branch supply ports 38a and 38b. The steam supplied to the fore insert 6 is sprayed from impingement holes 8. After the blade wall is cooled, the steam flows into the fore recovery path 12. The steam flowing in the fore recovery path 12 flows in the aft insert 7 through the communication path 40. The steam flowing in the aft insert is sprayed from impingement holes 9 to cool the blade wall. The steam is finally recovered from the aft recovery path 14 through the recovery port 20.

In the fourth embodiment, the steam which cooled the front portion of the blade body 1 cools the rear portion of the blade body 1. The temperature of the steam recovered from the blade is increased. When the gas turbine having this blade is used in the combined cycle power plant, the recovered steam is returned to the steam turbine. Therefore, since the temperature of the recovered steam is high, efficiency of the steam turbine can be improved.

Figures 8, 9:
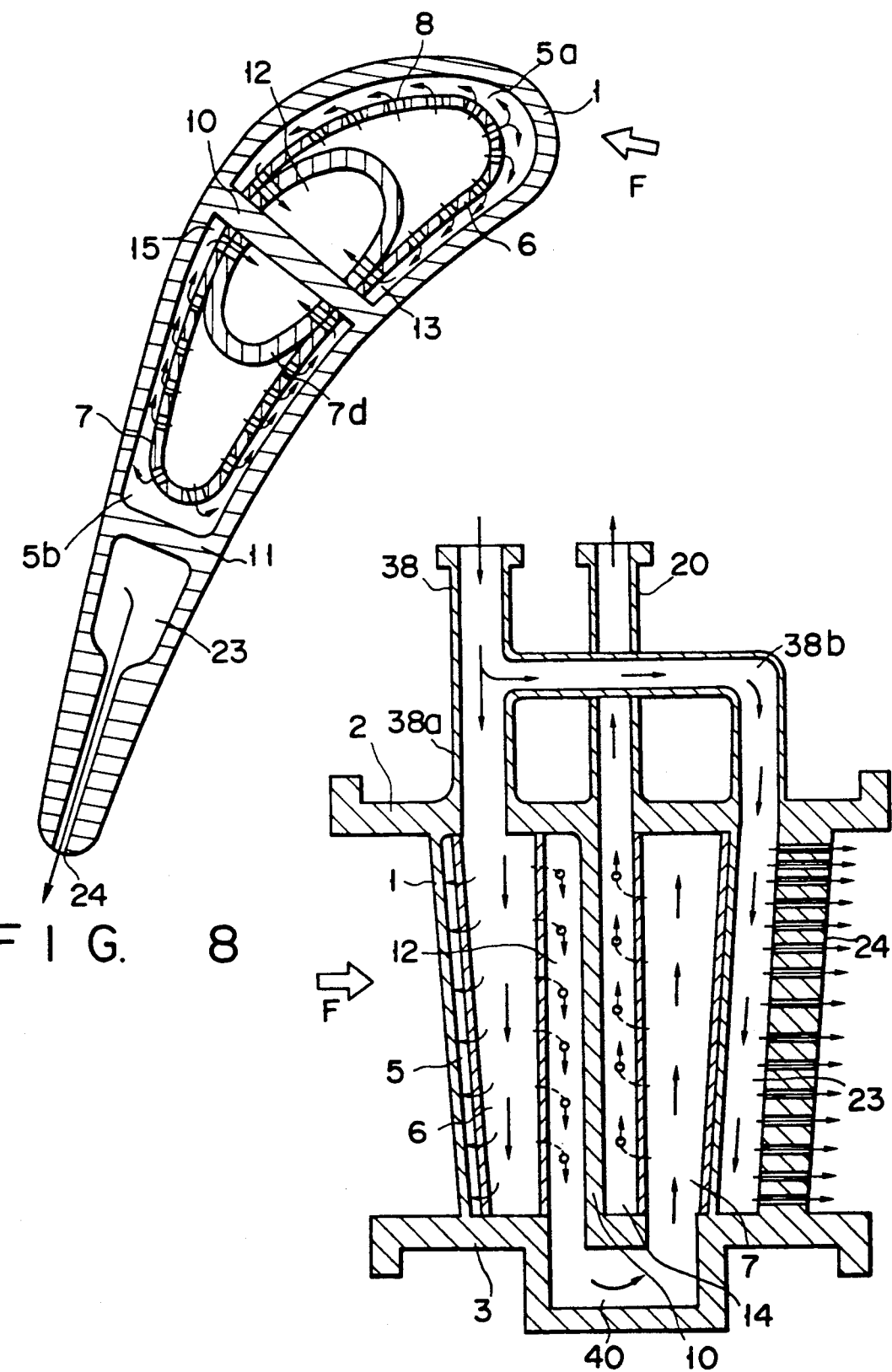
FIG. 8 is a cross-sectional view of a blade according to the fifth embodiment of the present invention.
FIG. 9 is a longitudinal sectional view of the blade of the fifth embodiment shown in FIG. 8.

A blade of the fifth embodiment is shown in FIGS. 8 and 9. The blade of the fifth embodiment has the same arrangement as that of the fourth embodiment except for the following members. The same reference numerals as in the first embodiment denote the same parts in the fifth embodiment in FIGS. 8 and 9, and a detailed description thereof will be omitted. The structure of an aft insert 7 and an aft recovery path 14 is the same as that of the fore inset 6 and the fore recovery path 12. That is, the aft insert 7 of the fifth embodiment has a U sectional shape, a recovery wall 7d having a U sectional shape is formed inside the leading edge portion of the aft insert 7. A space surrounded by the recovery wall 7d and a partition wall 10 is formed in the aft recovery path.

In the fifth embodiment, as shown in FIG. 9, an aft recovery path 14 communicates with the aft insert 7 through a communication path 40 formed in an inner shroud 3. A cooling gas supply port 38 communicates with a fore insert 6 and a trailing edge cooling path 23 through branch supply ports 38a and 38b. A recovery port 20 communicates with the aft recovery path 14.

Figure 10:
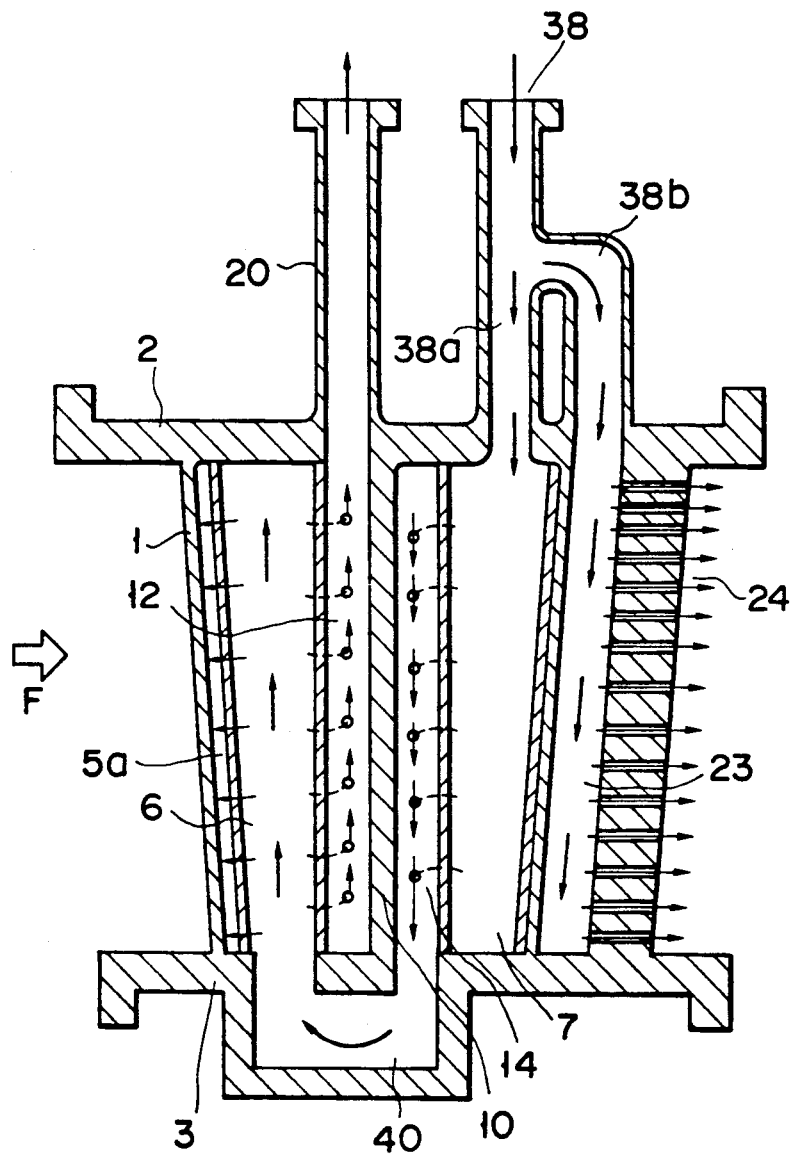
FIG. 10 is a longitudinal sectional view of a blade according to the sixth embodiment of the present invention.

FIG. 10 shows the sixth embodiment. The sixth embodiment is different from the fifth embodiment in that a path for causing a cooling gas such as steam to flow is reversed, i.e., the layout of the supply and recovery ports is reversed. Other arrangement of the sixth embodiment are the same as those of the fifth embodiment. Only the longitudinal sectional view of the sixth embodiment is shown in FIG. 10. The cross-sectional view of the sixth embodiment is the same as FIG. 8.

In the sixth embodiment, supply port 38 communicates with an aft insert 7 and a trailing edge cooling path 23 through branch supply ports 38a and 38b. A recovery port 20 communicates with a fore recovery path 12. An aft recovery path 14 communicates with a fore inset 6 through a communication path 40.

In the sixth embodiment, steam is supplied to the aft insert 7 and is sprayed from it to cool the blade wall. The steam is then recovered through the aft recovery path 14 and flows in the fore insert 6 through the communication path 40. The steam is then sprayed from the fore insert 6 to cool the blade wall. The steam is recovered into the fore recovery path 12 and discharged from the recovery port 20.

Figures 11, 12:
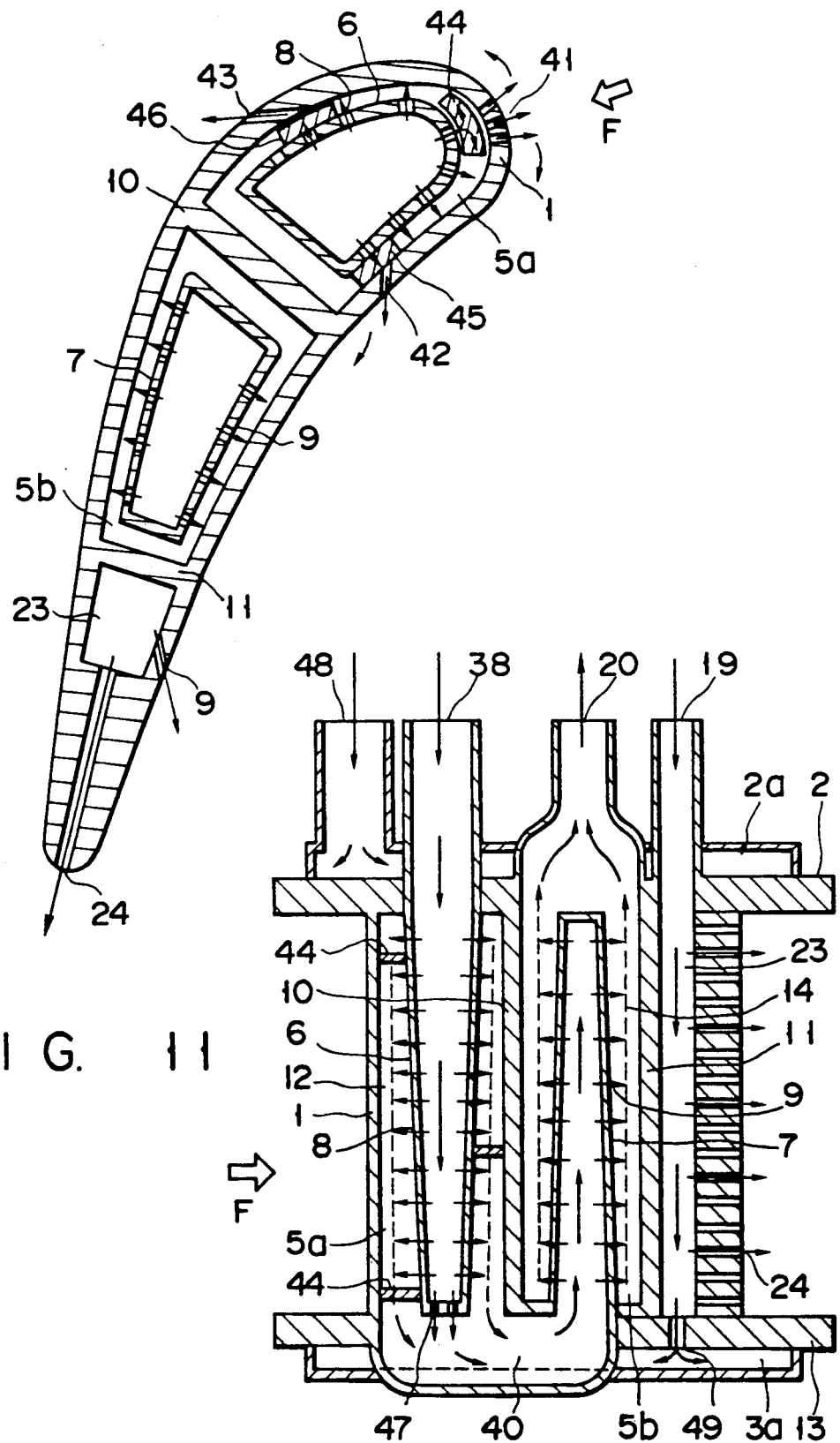
FIG. 11 is a cross-sectional view of a blade according to the seventh embodiment of the present invention.
FIG. 12 is a longitudinal sectional view of the blade of the seventh embodiment shown in FIG. 11.

FIGS. 11 and 12 show the seventh embodiment. Each embodiment from the seventh embodiment exemplifies a type in which steam is sprayed from impingement holes of the inserts to cool the blade wall, and then flows and is recovered in the direction of span.

The structure of a blade body 1 of the seventh embodiment is basically the same as that of each of the previous embodiments. A fore insert 6 is inserted into a fore cavity 5a of the blade body 1 from an outer tip in the direction of span. A cooling gas supply port 38 communicates with the fore insert 6. A cooling gas supply port 19 communicates with a trailing edge cooling path 23. An aft inset 7 is inserted into an aft cavity 5b from an inner tip in the direction of span. A recovery port 20 is formed in the aft cavity 5b. A communication path 40 is formed in an inner shroud 3. The fore cavity 5a and the aft insert 7 communicate with each other through the communication path 40.

Shroud cooling paths 2a and 3a are formed on the rear surface sides of an outer shroud and the inner shroud 3, respectively. A cooling gas such a steam is supplied to the cooling paths 2a and 3a through a supply path 48 and a communication hole 49.

The inserts 6 and 7 have a sectional shape corresponding to the sectional shape of the blade body. A substantially predetermined gap is formed between the blade wall and the side walls of the inserts 6 and 7. The fore insert 6 has a shape tapered toward the inner side. The inserts 6 and 7 are tapered to compensate for a decrease in pressure of a cooling gas such as steam sprayed from each impingement hole is made uniform.

Communication holes 47 are formed in the inner end portion of the fore insert 6. Part of the steam in the fore insert 6 flows in the communication path 40 through these communication holes 47. The steam flows in the aft insert 7 through this communication path. Part of the low-temperature steam in the fore insert 6 flows in the aft insert 7. The temperature of the steam in the aft insert 7 is decreased to improve a cooling effect of the aft cavity portion.

Of the respective portions of the blade body 1, pluralities of film cooling holes 41, 42, and 43 are formed through the blade wall at portions (e.g., a leading edge portion and a portion having a maximum thickness) whose temperatures become maximum. Part of the steam sprayed from the fore insert 6 is sprayed on the outer circumferential surface of the blade body 1 through the film cooling holes and flows along this outer circumferential surface. Heat transmitted from the these blade wall portions from the main gas is decreased by a film-like steam flow. These blade wall portions are cooled to improve cooling efficiency of the blade. Baffles 44, 45, and 46 are formed between the inner surface of a fore cavity 5a and the outer circumferential surface of the fore insert 6 in the direction of chord. These baffles regulate the steam flow in the direction of chord. The flow rate of the steam sprayed through the film cooling holes is controlled.

In the seventh embodiment, a space formed between the blade wall and the inserts 6 and 7 serves as a recovery path. The steam sprayed from impingement holes 8 and 9 of the inserts 6 and 7 flows in the recovery path along the direction of span and is recovered.

Figure 13:
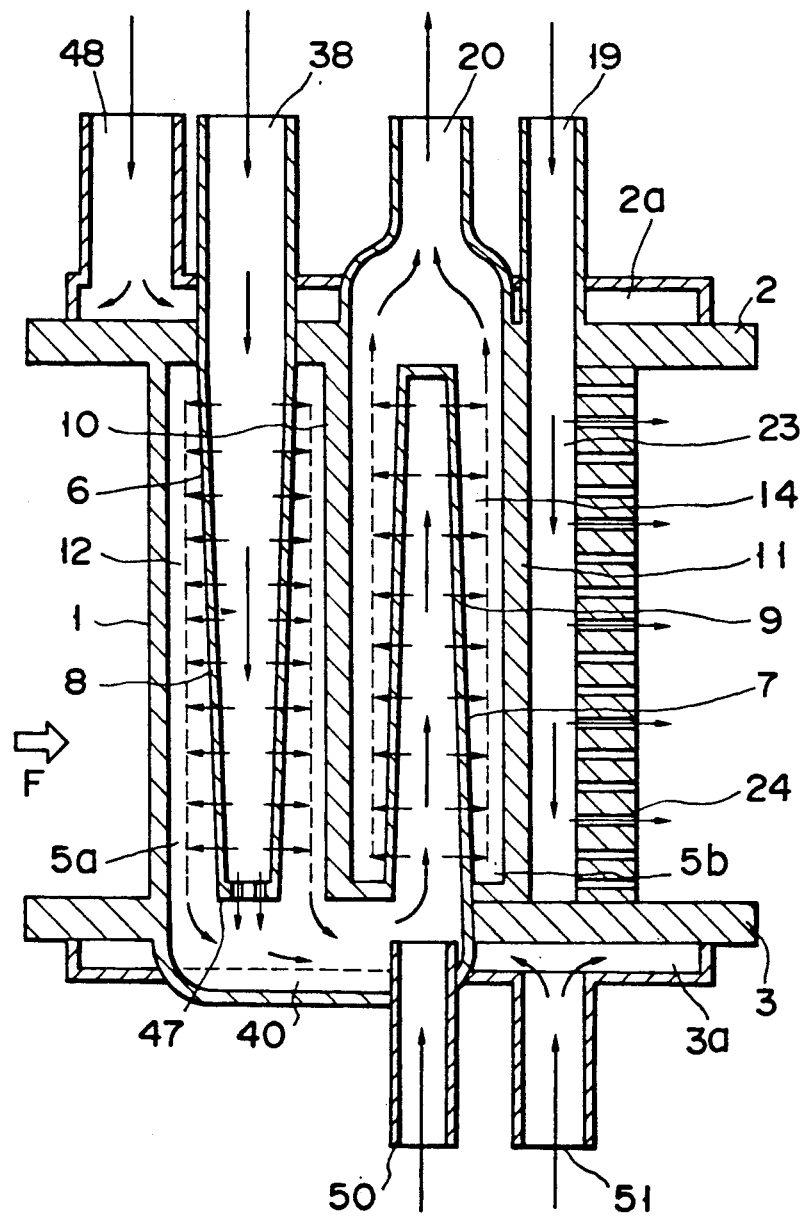
FIG. 13 is a longitudinal sectional view of a blade according to the eighth embodiment of the present invention.

FIG. 13 shows the eighth embodiment. A blade of the eighth embodiment is obtained by adding an auxiliary supply port 50 to the structure of the seventh embodiment. The auxiliary supply port 50 communicates with a communication path 40. Low-temperature steam is supplied to the communication path 40 through this auxiliary supply port 50 to decrease the temperature of the steam supplied to an aft insert 7. Cooling efficiency of a portion of an aft cavity 5b is improved. In the eighth embodiment, an auxiliary supply port 51 communicates with a shroud cooling path 3a of an inner shroud 2. The steam is supplied to the shroud cooling path 3a through an auxiliary supply port 51.

Figure 14:
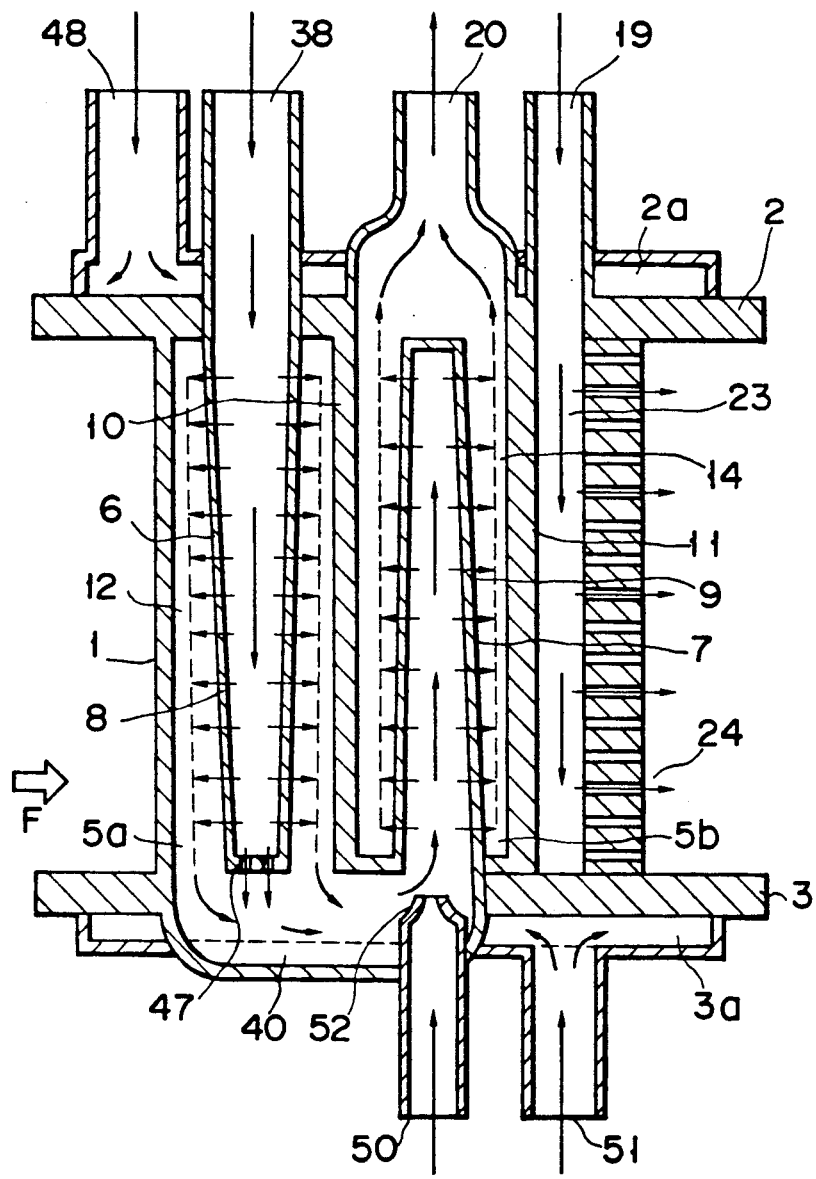
FIG. 14 is a longitudinal sectional view of a blade according to the ninth embodiment of the present invention.

FIG. 14 shows the ninth embodiment. The ninth embodiment exemplifies a structure in which the diameter of a leading end portion of an auxiliary supply port 50 in the eighth embodiment is reduced to form a nozzle 52. Water or steam is supplied from the auxiliary supply port 52. The water or steam is sprayed from the nozzle 52 to form small foggy particles. These particles flow in an aft insert 7. The temperature of the steam supplied to the aft insert 7 is decreased by the water or steam supplied from the auxiliary supply port 52 through the small-diameter nozzle 52, thereby improving cooling efficiency of the portion of an aft cavity 5b.

Figures 15, 16:
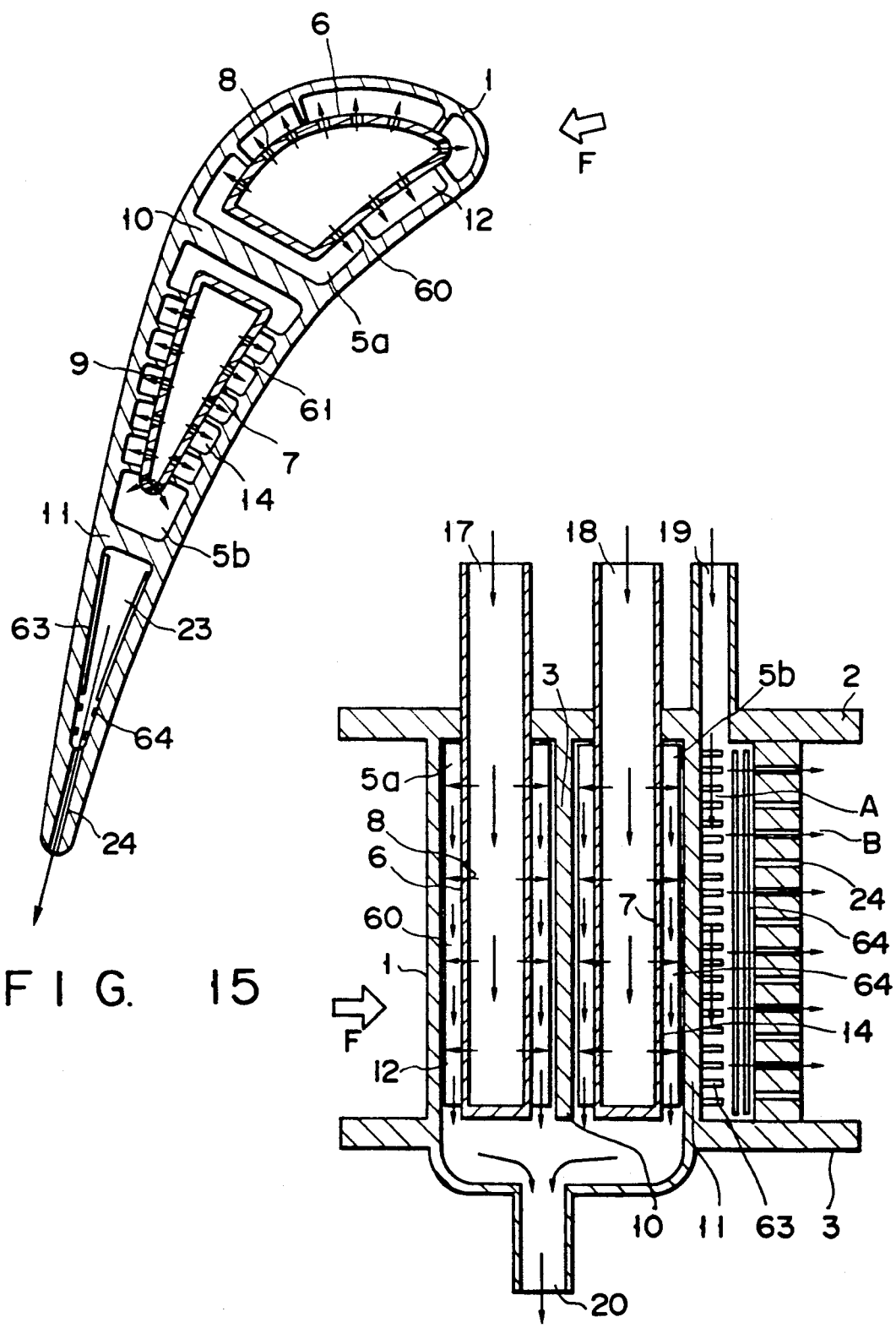
FIG. 15 is a cross-sectional view of a blade according to the tenth embodiment of the present invention.
FIG. 16 is a longitudinal sectional view of the blade of the tenth embodiment shown in FIG. 15.

FIGS. 15 and 16 show the tenth embodiment. In the tenth embodiment, a fore insert 6 and an aft insert 7 are respectively inserted in a fore cavity 5a and an aft cavity 5b of a blade body 1 from an outer tips. Pluralities of impingement holes 8 and 9 are respectively formed in the walls of the inserts 6 and 7. Cooling gas supply ports 17 and 18 communicate with the inserts and 7, respectively. The inner tip portions of the cavities 5a and 5b communicate with a common recovery port 20.

A cooling gas such as steam supplied from the supply ports 17 and 18 flows in the inserts 6 and 7 in the direction of span and is sprayed from the impingement holes 8 and 9 The sprayed steam collides against the inserts 6 and 7 and the blade wall, thereby cooling the wall. The steam flows in a path (i.e., a recovery path) formed between the inserts 6 and 7 and the blade wall in the direction of span and is recovered from the recovery port 20.

In the tenth embodiment, pluralities of ribs 60 and 61 are formed on the inner surface of the blade wall which surrounds the fore cavity 5a and the aft cavity 5b. These ribs 60 and 61 are continuously formed in the direction of span, and their leading edge portions are in contact with the outer circumferential surfaces of the inserts 6 and 7. These recovery paths are divided into a plurality of flow channels by the ribs 60 and 61. The steam sprayed from the impingement holes 8 and 9 of the inserts 6 and 7 flows in these flow channels In the blade of the tenth embodiment, the area which contacts the steam is increased by the ribs 60 and 61 to increase the cooling effect. The blade structure can be reinforced by the ribs 60 and 61. By changing an amount of steam sprayed from the impingement holes the distribution of the cooling capacity of the blade in the direction of chord can be arbitrarily set in units of flow channels by the ribs.

In the tenth embodiment, the cooling capacity of the trailing edge portion can be increased. A cooling gas supply port 19 communicates with a trailing edge cooling path 23. Pluralities of turbulence promoters 63 and 64 extend on the inner surface of the trailing edge cooling path 23. These turbulence promoters are projections extending on the wall surface. The turbulence promoters 63 formed in the front portion of the trailing edge cooling path 23 extend along the direction of chord. The turbulence promoters 64 formed in the rear portion of this trailing edge cooling path extend in the direction of span. Steam supplied from the supply port 19 to the trailing edge cooling path 23 flows in the front portion of the trailing edge cooling path 23 in the direction of chord and is discharged in the main gas from the trailing edge of the blade through a discharge cooling path 24. The turbulence promoters 63 and 64 are arranged in a direction perpendicular to the direction of steam flow in the trailing edge cooling path 23. Cooling efficiency of the trailing edge portion is improved by the turbulence promoters 63 and 64 due to the following reason.

The sectional area of the trailing edge cooling path 23 is small. The flow in the path 23 has a small Reynolds number and becomes a laminar flow. In this state, heat transfer between the steam flowing in the path 23 and the wall surface of the path becomes small. In the tenth embodiment, since the turbulence promoters 63 and 64 are arranged in a direction perpendicular to the steam flow, the flow in the path 23 becomes a turbulent flow, thus increasing heat transfer between the steam and the wall surface of the path 23. Therefore, the cooling capacity of the trailing edge portion of the blade can be increased.

Figure 17:
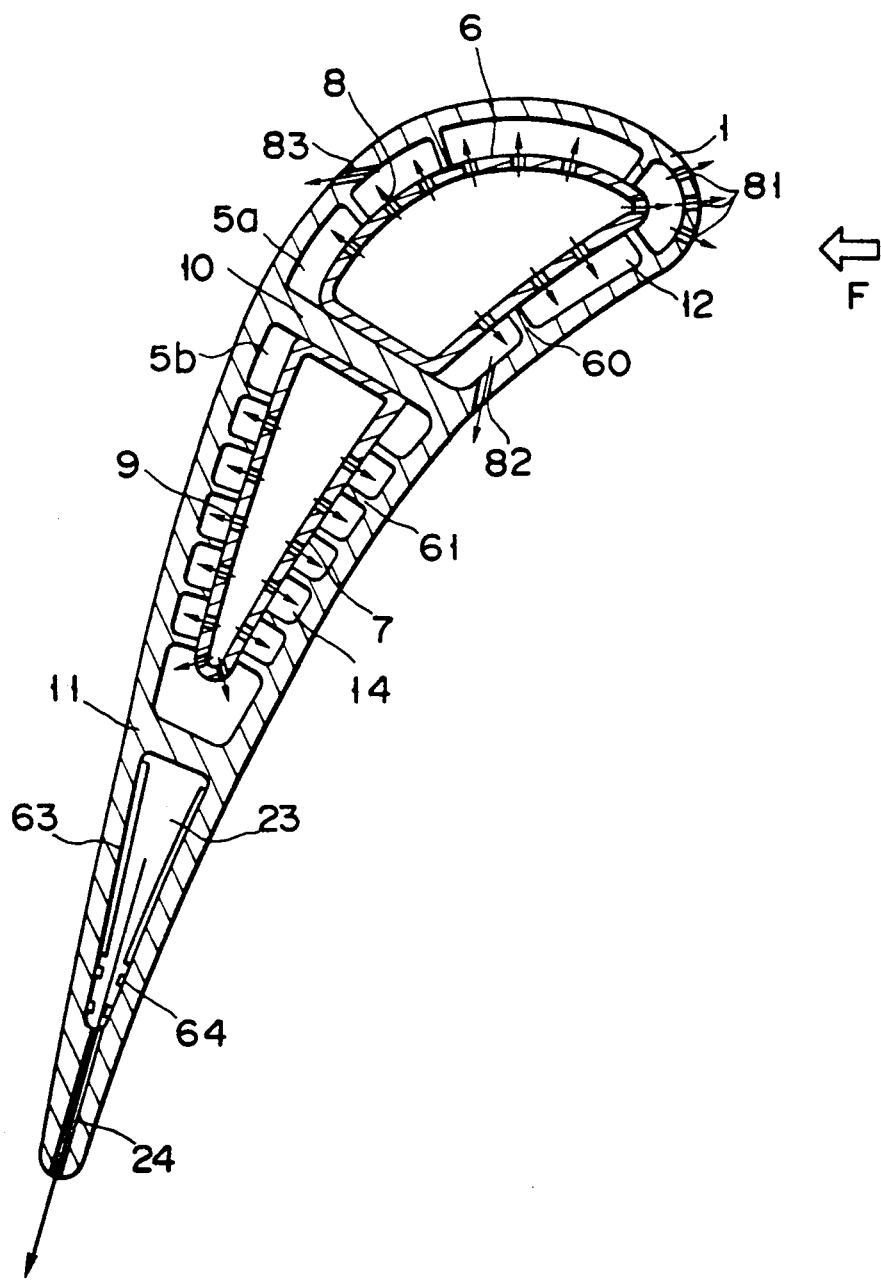
FIG. 17 is a cross-sectional view of a blade according to the eleventh embodiment of the present invention.

FIG. 17 shows the eleventh embodiment. A blade of the eleventh embodiment is obtained by adding film cooling holes 81, 82, and 83 to the blade of the tenth embodiment. These film cooling holes 81, 82, and 83 are formed in highest-temperature portions such as a leading front edge and a portion having a maximum wall thickness in a blade body 1. The film cooling holes 81, 82, and 83 are formed in the blade wall and communicate with the flow channels divided by ribs 60. The flow channels which communicate with these film cooling holes do not communicate with a recovery port 20. Therefore, the steam sprayed from the impingement holes to the flow channels is entirely sprayed from the film cooling holes.

Figures 18, 19:
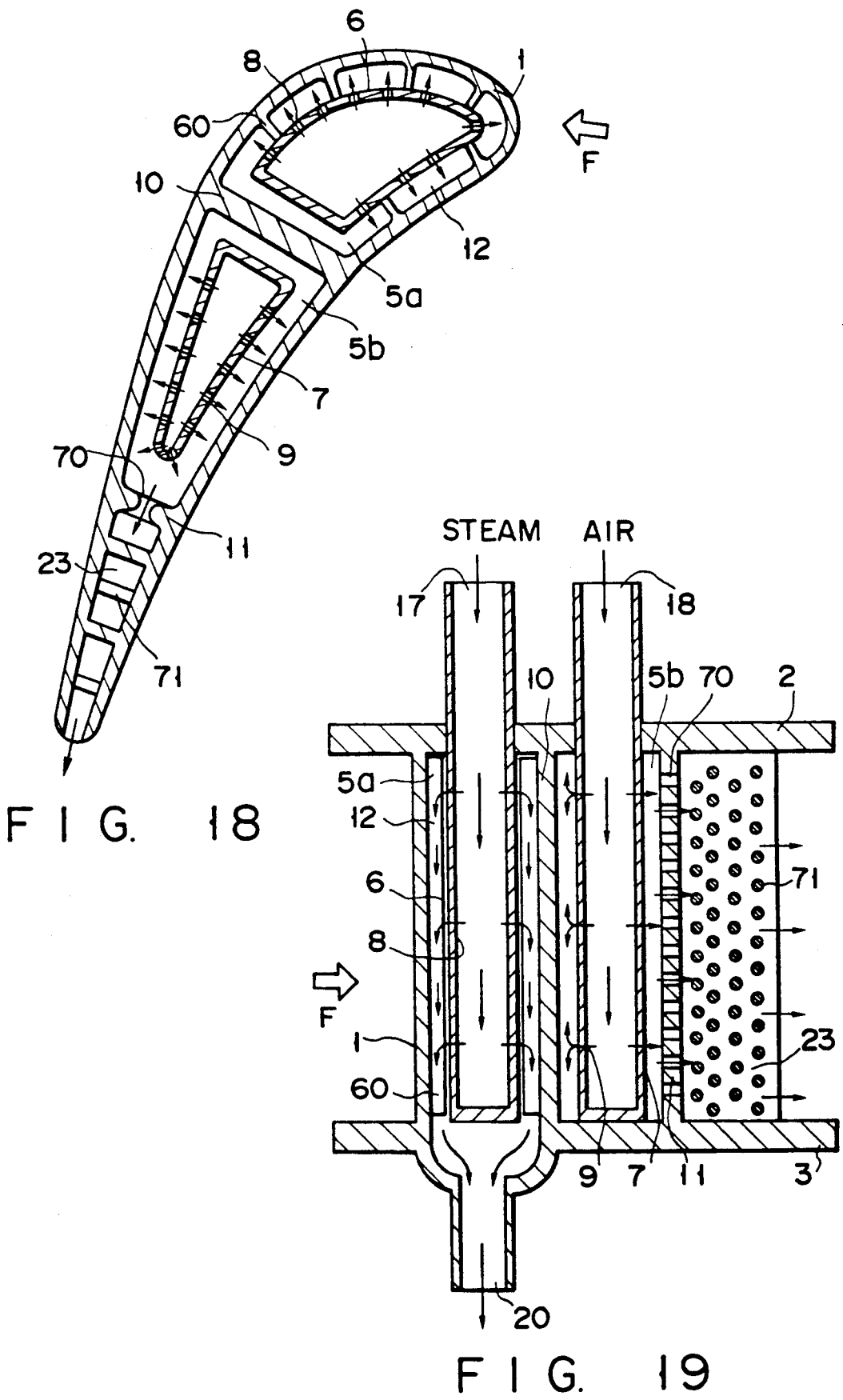
FIG. 18 is a cross-sectional view of a blade according to a twelfth embodiment of the present invention.
FIG. 19 is a longitudinal sectional view of the blade of the twelfth embodiment shown in FIG. 18.

FIGS. 18 and 19 show the twelfth embodiment. This embodiment has the same structure as that of the eleventh embodiment except for a structure of a rear edge cooling path 23.

The trailing edge cooling path 23 is formed continuously with a trailing edge portion of a blade body 1 in the direction of span. The trailing edge of the trailing edge cooling path 23 has a slit extending in the direction of span and is open to the trailing edge of the blade. The trailing edge cooling path 23 and an aft cavity 5b are partitioned by a partition wall 11. A plurality of communication holes 70 are formed in the partition wall 11. Steam flows from the aft cavity 5b to the trailing edge cooling path 23 through these communication paths 70 in the direction of chord. The cooling gas flowing in the trailing edge cooling path 23 flows along the path 23 in the direction of chord. The trailing edge portion of the blade is cooled by the steam, and the steam is then discharged from the slit-like opening of the trailing edge of the path 23 to the main gas. A plurality of pin fins 71 are formed in the path 23. The pin fins 71 have almost a circular section and extend from the wall surfaces of the both sides of the path 23 in a direction perpendicular to the path 23.

In the twelfth embodiment, the aft cavity 5b does not communicate with a recovery port 20. Steam serving as a cooling gas is supplied to a fore insert 6 through the recovery port 20. Air serving as a cooling gas is supplied to the aft insert 7 through a supply port 18. This air is sprayed from impingement holes 9 of an aft insert 7 to cool the blade wall and flows in the trailing edge cooling path 23 to cool the trailing edge portion of the blade. The air is then discharged in the main gas.

In the twelfth embodiment, the cooling gas discharged in the main gas is air-having a small specific heat. In addition, this air cools the aft cavity portion and the trailing edge portion and is then discharged. The air has a high temperature, and the temperature of the main gas is not decreased. The pin fins 71 extend to cross the trailing edge cooling path, and a turbulent flow is formed in the path 23, thereby improving cooling efficiency. In addition, the walls of both the sides of the path 23 are coupled by the pin fins, and therefore the blade structure can be strengthened.

The blade in each embodiment of the present invention as described above can effectively recover the cooling gas such as steam. The steam is not discharged into the main gas to prevent the main gas from a decrease in temperature. In each blade of the present invention, cross-flow between the gas sprayed from the impingement holes and the gas flowing in the direction of chord or span can be suppressed, thus improving cooling efficiency even if the cooling medium (e.g., air) is discharged into the main gas.

It is possible to constitute a combined cycle power plant having high efficiency by using a gas turbine having this blade. An embodiment of such a plant will be described below.

Figure 20:
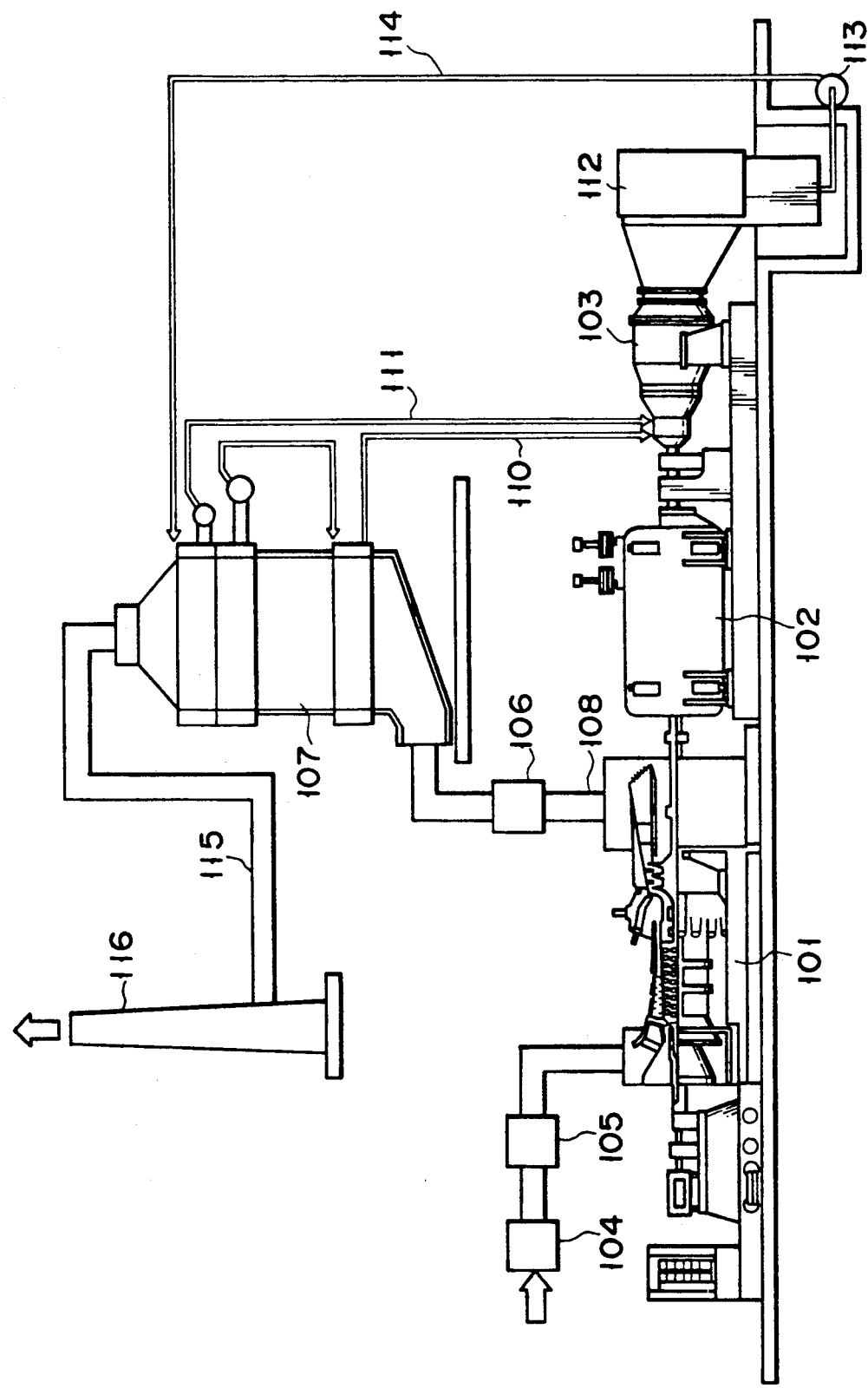
FIG. 20 is a schematic view of a combined cycle power plant utilizing a gas turbine utilizing the blade of the present invention.

FIG. 20 schematically shows the overall structure of the plant. This power plant is a uniaxial plant for causing a gas turbine 101 and a steam turbine 103 to drive a generator 102.

The gas turbine 101 comprises a turbine blade as described above. The gas turbine 101 receives air through an intake filter 104 and an intake silencer 105. The air discharged from the gas turbine 101 is supplied to a discharge heat recovery boiler 107 through a discharge duct 108 and a discharge silencer 106. Steam is produced by the boiler 107, and this steam is supplied to steam turbine 103 through a high-pressure pipe 110 and a low-pressure pipe 111, thereby driving the steam turbine. Water discharged from a condenser 112 is supplied to the boiler 107 through a water supply pipe 114. The air discharged from the boiler 107 is supplied to a chimney 116 through a duct 115.

Figure 21:
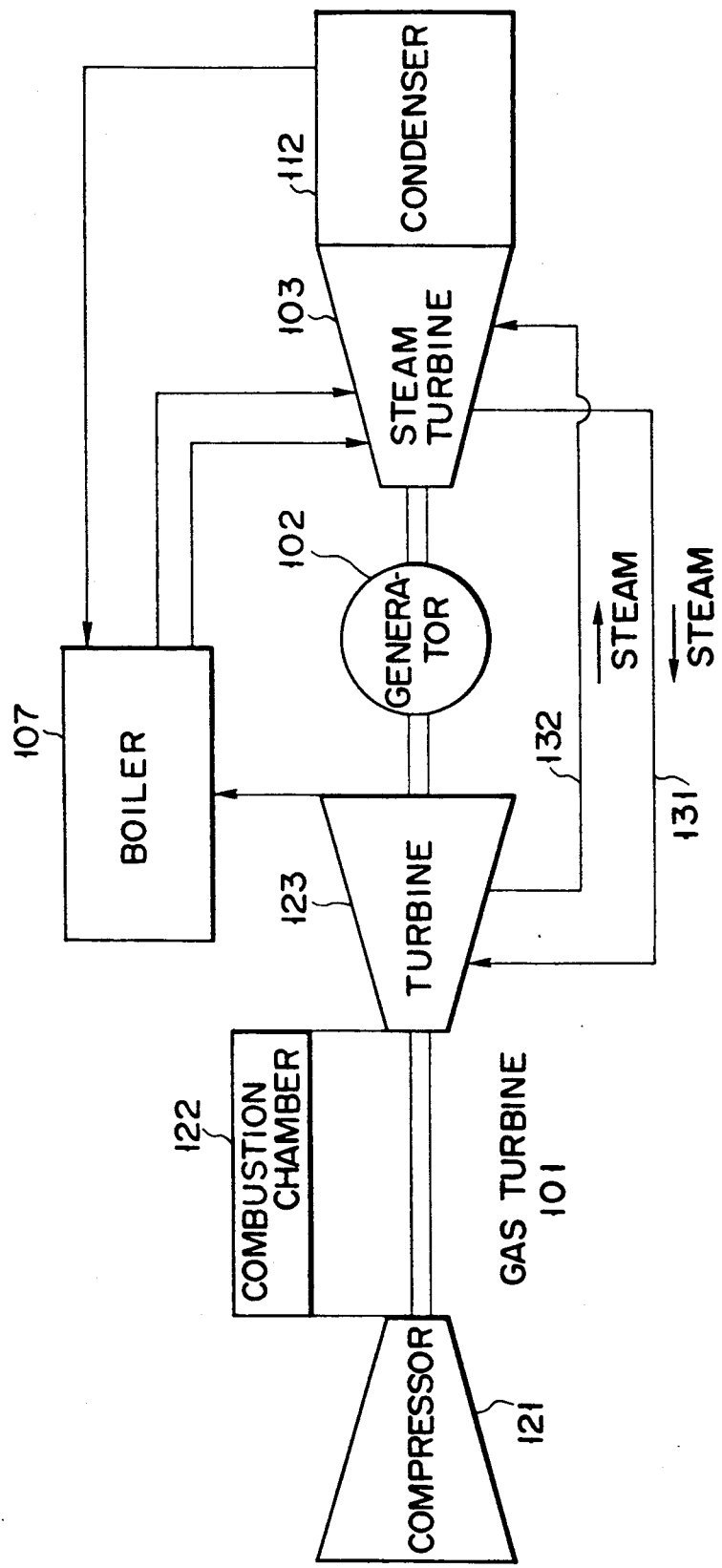
FIG. 21 is a view illustrating part of the plant shown in FIG. 20.

FIG. 21 schematically shows a turbine blade cooling steam system in such a plant. A low-temperature steam bled from the steam turbine 13 is supplied to a turbine 123 of the gas turbine engine 101. Reference numeral 121 denotes a compressor; and 122, a combustion chamber. The steam supplied to the turbine 123 is supplied to the turbine blade described above to cool the blade. The blade can be effectively cooled by the steam, and the temperature of the main gas which passes through the turbine can be increased, and efficiency of the gas turbine 101 can be improved.

The steam whose temperature is increased upon cooling of the turbine blade of the gas turbine engine 101 is returned as described above. The steam is then returned to the steam turbine 103 through a steam recovery pipe 132. The returned steam has a higher temperature than the bled steam to improve the efficiency of the steam turbine 103.

The efficiency of the gas turbine engine can be improved in the combined cycle power plant which utilizes the gas turbine engine having the blade of the present invention. At the same time, the efficiency of the steam turbine is improved, and the great improvement of heat efficiency as the plant as a whole can be improved.

Figure 1:
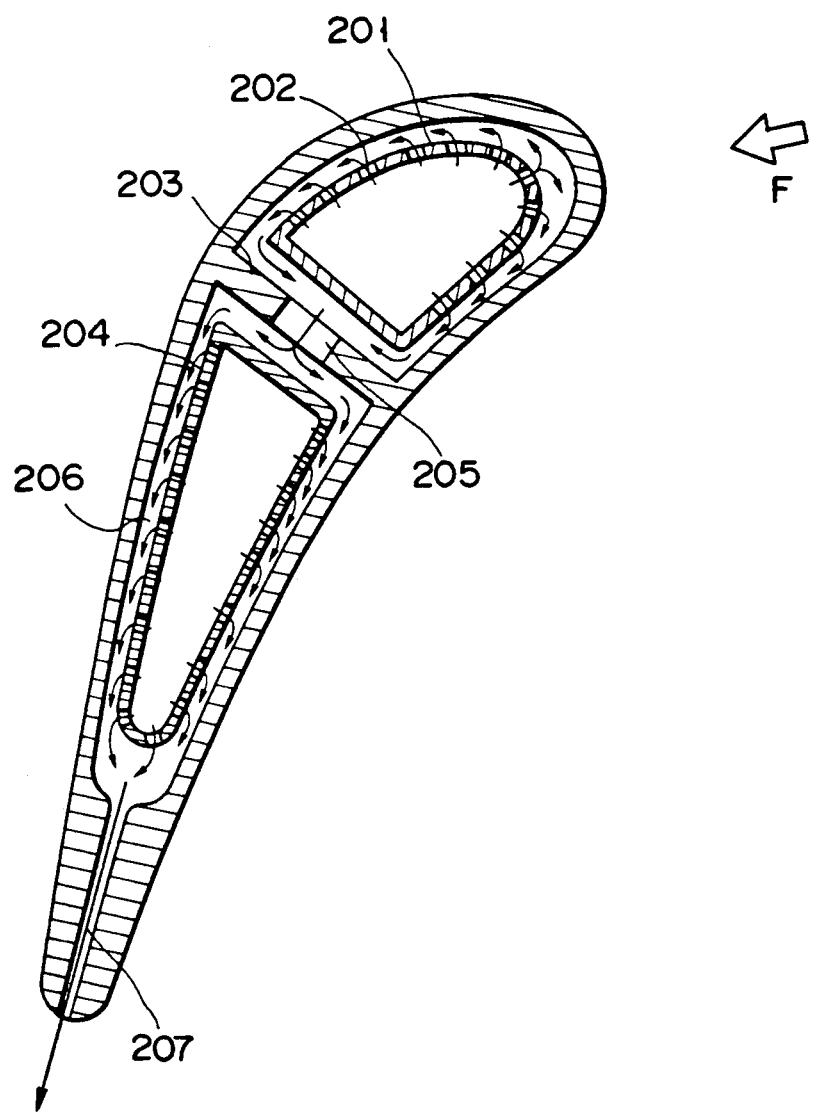
FIG. 1 is a cross-sectional view of a conventional blade.
Figure 22:
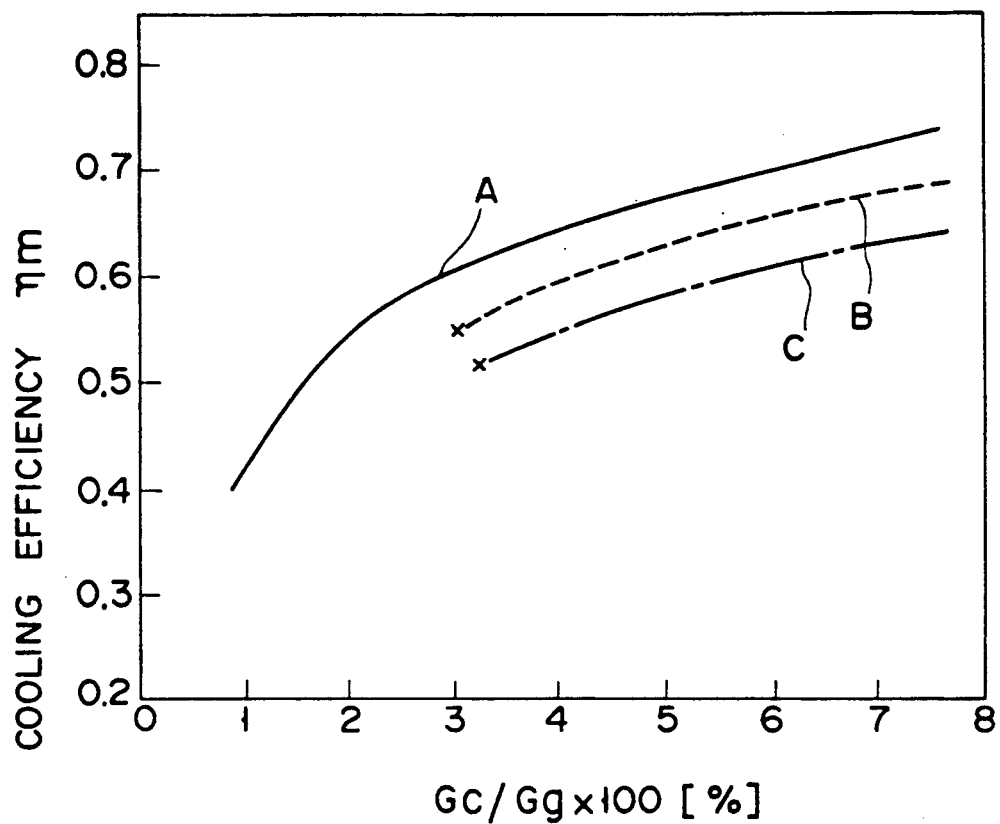
FIG. 22 is a graph showing cooling efficiency characteristics of the blade of the present invention and the conventional blade.

FIG. 22 shows characteristics of cooling efficiency of the turbine blade. A curve A in FIG. 22 is a characteristic curve when steam is supplied as a cooling gas to the turbine blade of the eleventh embodiment (FIG. 17). A curve B is a characteristic curve when steam is supplied as a cooling gas to the conventional blade (FIG. 1). A curve C is a characteristic curve when air is supplied as a cooling gas to a conventional blade.

Cooling efficiency $\eta m$ is defined as follows:

$$\eta m = (Tg - Tm)/(Tg - Tc)$$

where
  Tg: main gas temperature
  Tc: cooling gas temperature
  Tm: blade temperature and
  Gg: main gas temperature
  Gc: cooling medium temperature As is apparent from FIG. 22, the blade of the present invention has higher cooling efficiency than that of the conventional blade. Therefore, the temperature of the main gas can be increased, and efficiency of the gas turbine engine can be improved.

As shown in FIG. 22, when the flow rate of the cooling gas is increased, the cooling efficiency can be improved. An increase in flow rate of the cooling gas can improve efficiency of the gas turbine engine. Since the cooling gas is discharged in the main gas in the conventional blade, the temperature of the main gas is decreased with an increase in flow rate of the cooling gas, thus degrading cooling efficiency. Since the blade according to the present invention, however, recovers the cooling gas the flow rate of the cooling gas can be sufficiently increased. In addition the recovered cooling gas, i.e., the recovered steam is turned to the steam turbine, and efficiency of the steam turbine is improved. Therefore, efficiency of the plant as a whole according to the present invention can be greatly improved.

What is claimed is:

1. A cooled turbine blade through which a cooling medium passes, comprising:
    a blade body having cavities extending in a direction of spray, said cavities including at least a fore cavity formed in a front portion of said blade body and an aft cavity formed in a rear portion of said blade body;
    a fore hollow insert and an aft hollow insert mounted in said fore and aft cavities, respectively, an outer surface of a circumferential wall of said inserts and an inner wall surface of said blade body defining a gap therebetween, said circumferential wall of said inserts being provided with a plurality of impingement holes, and the cooling medium being sprayed from said impingement holes to said inner wall surface of said blade body; and
    recovery paths formed in one-end portions of said fore and aft cavities, respectively, the cooling medium sprayed from said impingement holes cooling a wall of said blade body and flowing in said recovery paths and being recovered from said blade body through said recovery paths.

2. A blade according to claim 1, which further comprises a communication path through which the cooling medium sprayed from said fore insert and recovered through said fore recovery path is supplied to said aft insert.

3. A blade according to claim 2, wherein an auxiliary supply port is formed to communicate with said communication path, and a flow of the cooling medium supplied to said aft insert is added with a new cooling medium through said auxiliary supply port.

4. A blade according to claim 1, wherein a trailing edge cooling path is formed in a trailing edge portion of said blade body, and the cooling medium is supplied to said trailing edge cooling path, cools said trailing edge portion, and is discharged from said tailing edge portion of said blade body in a main gas.

5. A blade according to claim 1, wherein film cooling holes which communicate with said cavity and open to said outer wall surface of said blade body are formed in said wall of said blade body and part of the cooling medium sprayed from said insert flows as a film-like flow along said outer wall surface of said blade body; and baffles are arranged between said outer circumferential surface of said wall of said insert and said inner wall surface of said blade body in the direction of chord, and a flow of the cooling medium in the direction of span is regulated by said baffles, thereby controlling a flow rate of the cooling medium sprayed from said film cooling holes.

6. A blade according to claim 1, wherein shrouds are respectively formed at both tips of said blade body.

7. A blade according to claim 6, wherein cooling paths are respectively formed in said shrouds and receive the cooling medium, thereby cooling said shrouds.

8. The blade according to claim 6, wherein the cooling medium recovered in said recovery path is supplied to said cooling path of said shrouds.

9. The blade according to claim 6, wherein an auxiliary supply port communicating with said cooling path of said shrouds, and new cooling medium is added to the cooling path through the auxiliary supply port.

* * * * *